United States Patent
Peleg et al.

(10) Patent No.: US 8,934,722 B2
(45) Date of Patent: Jan. 13, 2015

(54) SYSTEM AND METHOD FOR CLASSIFICATION OF IMAGE DATA ITEMS BASED ON INDIRECT USER INPUT

(71) Applicant: Given Imaging Ltd., Yoqneam (IL)

(72) Inventors: Dori Peleg, Haifa (IL); Hagai Krupnik, Nofit (IL)

(73) Assignee: Given Imaging Ltd., Yoqneam (IL)

( * ) Notice: Subject to any disclaimer, the term of this patent is extended or adjusted under 35 U.S.C. 154(b) by 178 days.

(21) Appl. No.: 13/622,544

(22) Filed: Sep. 19, 2012

(65) Prior Publication Data
US 2013/0070986 A1    Mar. 21, 2013

Related U.S. Application Data

(60) Provisional application No. 61/536,156, filed on Sep. 19, 2011.

(51) Int. Cl.
*G06K 9/62* (2006.01)
(52) U.S. Cl.
CPC .................. *G06K 9/6254* (2013.01)
USPC ........................................ 382/224
(58) Field of Classification Search
CPC . G06K 9/6217; G06K 9/6254; G06K 9/6256; G06K 9/626; G06K 9/6267; G06K 9/6268; G06K 2209/05; G06K 2209/051; G06K 2209/053; G06T 7/012; G06T 2207/10068; G06T 2207/20004
USPC .................. 382/128, 224, 226, 227, 228, 311
See application file for complete search history.

(56) References Cited

U.S. PATENT DOCUMENTS

| | | | |
|---|---|---|---|
| 4,278,077 A | 7/1981 | Mizumoto | 128/4 |
| 4,936,823 A | 6/1990 | Colvin et al. | 600/7 |
| 5,604,531 A | 2/1997 | Iddan et al. | 348/76 |
| 5,697,384 A | 12/1997 | Miyawaki et al. | 128/899 |
| 5,993,378 A | 11/1999 | Lemelson | 600/109 |
| 6,240,312 B1 | 5/2001 | Alfano et al. | 600/476 |
| 7,009,634 B2 | 3/2006 | Iddan et al. | 348/76 |
| 2002/0103417 A1 | 8/2002 | Gazdzinski | 600/100 |
| 2003/0167000 A1 | 9/2003 | Mullick et al. | 600/424 |
| 2003/0208107 A1 | 11/2003 | Refael | 600/300 |
| 2009/0028434 A1* | 1/2009 | Vanhoucke et al. | 382/182 |
| 2009/0150330 A1* | 6/2009 | Gobeyn et al. | 707/1 |

OTHER PUBLICATIONS

Drozdzal et al., "Interactive Labeling of WCE Images", IbPRIA 2011, LNCS 6669, pp. 143-150, 2011.
Hoi et al., "Batch Mode Active Learning and Its Application to Medical Image Classification", Proceedings of the 23rd International Conference on Machine Learning, 2006, pp. 417-424.

* cited by examiner

*Primary Examiner* — Andrew W Johns
(74) *Attorney, Agent, or Firm* — Pearl Cohen Zedek Latzer Baratz LLP (57) ABSTRACT

A system and method for classification of images of an image stream may include receiving an image stream of unclassified images, for example produced by an in-vivo imaging device, and based on indirect user input, adapting an initial classification algorithm to classify images to groups based on at least a subset of the received image stream of unclassified images. The indirect user input may be used to generate user-based indications for the classification.

15 Claims, 6 Drawing Sheets

SYSTEM AND METHOD FOR CLASSIFICATION OF IMAGE DATA ITEMS BASED ON INDIRECT USER INPUT

The present application claims benefit from prior U.S. provisional application 61/536,156 filed on Sep. 19, 2011, entitled "SYSTEM AND METHOD FOR CLASSIFICATION OF IMAGE DATA ITEMS", incorporated herein by reference in its entirety.

FIELD OF THE INVENTION

The present invention relates to the field of classifying images obtained by an in-vivo device. More specifically, the present invention relates to adapting classification tools for more reliable classification of specific data sets.

BACKGROUND OF THE INVENTION

In some methods of medical diagnosis, a health professional may review a set or a stream of images of a body organ in order to identify pathological symptoms in this body organ.

In some cases the set of images is long and monotonous. For example, in some cases the set of images is captured along a path within the living body, and may include tens of thousands of images. Many of the images, and sometimes the vast majority of the images, may be of a healthy tissue and/or redundant for medical diagnosis. Therefore, it may be tiresome and time consuming to review the whole set of images in order to find suspected pathological symptoms, usually in a minority of the images.

Therefore, it may be desirable to enable a health professional to view a shortened set of images which excludes images that may be uninformative for medical diagnosis, such as images of healthy body tissue and/or redundant images.

Computer-Aided Diagnostics (CAD) may facilitate a more efficient review of a set of images by a health professional, by using computerized classification tools (classifiers) that enable classification of images, for example by computerized image processing and analysis methods. A classification algorithm may be obtained by machine learning based on a training set of images. The training set of images may include pre-labeled images, labeled by a professional as images of either healthy or suspected pathological tissue. A computer processor may analyze attributes of the images in the training set, and based on the attributes and usually some predetermined criterions may build an algorithm for classification of images as either healthy or suspected pathological tissue. Known computerized classification tools may receive a set of unlabeled images and classify the images based on the algorithm that was built based on the training set of labeled images. Typically, an image is analyzed by image processing in order to identify attributes that may imply a suspected pathological symptom.

Once the attributes of an image are identified, the algorithm may be used for classifying the image.

Accordingly, once the classification algorithm is built, the known CAD tools use the same classification algorithm for classifying input images from various input image streams, which may be received from different patients and different image stream segments related to the same patient's body. The classification algorithm in these tools is constant once it is built. Since the distribution of the image data items in the data space (to which the data items are mapped according to their attributes) is typically changing from patient to patient and also from segment to segment within the same image stream related to the same patient, the constant classification algorithm may not be optimal for all possible input images. Additionally, since CAD tools seek to avoid false-negative kind of errors (e.g., classification of an imaged situation as healthy by error) in all possible input images, the thresholds of the classification algorithm are set to classify as unhealthy even the most extreme possible cases with very low probability to be unhealthy.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatuses may be specially constructed for the desired purposes, or may comprise general purpose computers selectively activated or reconfigured by a computer program stored in the computers. Such computer programs may be stored in a non-transitory computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

Embodiments of the invention may include an article such as a non-transitory computer or processor readable storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

The processes and displays presented herein are not inherently related to any particular computer or other apparatus. Various general purpose systems may be used with programs in accordance with the teachings herein, or it may prove convenient to construct a more specialized apparatus to perform the desired method. It will be appreciated that a variety of programming languages may be used to implement the teachings of the invention as described herein.

Figure 1:
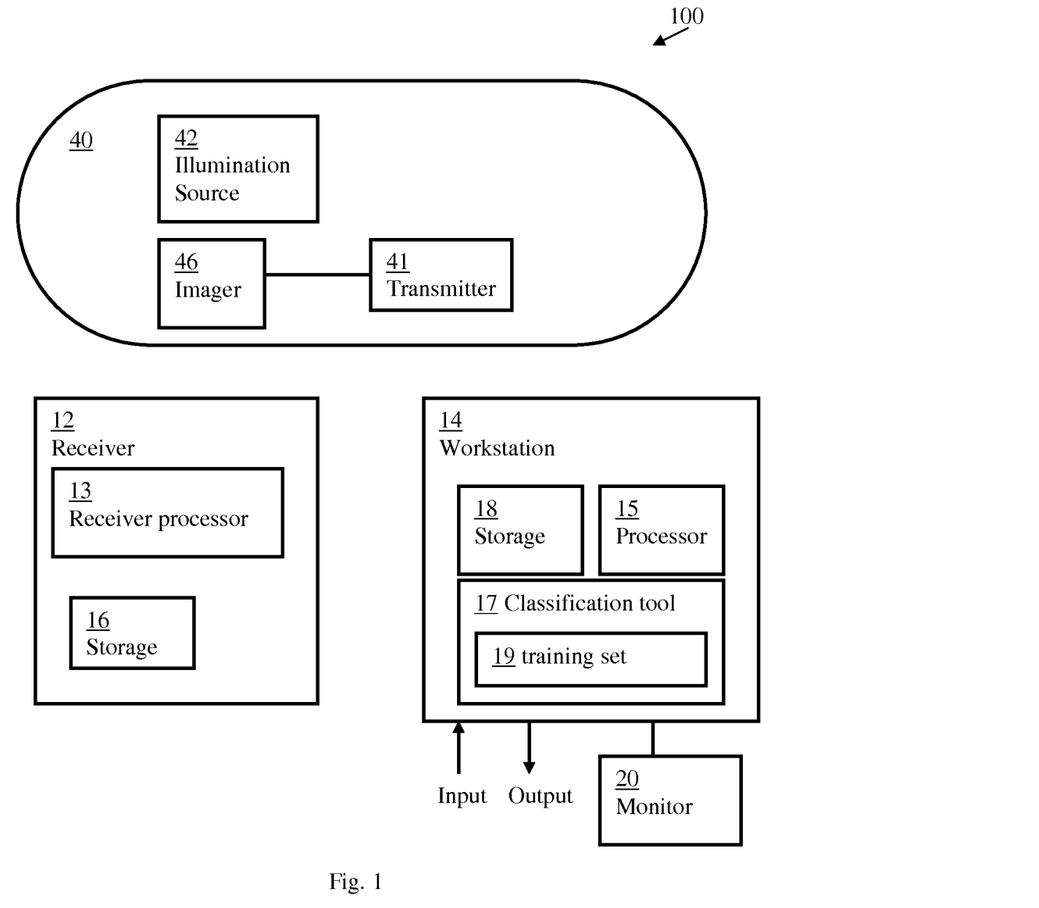
FIG. 1 is a schematic illustration of an in vivo imaging system according to some embodiments of the present invention.

Reference is now made to FIG. 1, which is a schematic illustration of an in vivo imaging system 100 according to some embodiments of the present invention. System 100 may include an in-vivo imaging or sensing device 40, an external receiver 12, which may include a processor 13, and a workstation 14, which may include a processor 15. Either of processor 13 or processor 15 may execute code or instructions to carry out embodiments of the present invention. The code may be stored, for example, in storage or memory 16 or storage or memory 18, which may be included in and/or communicate with, for example, external receiver 12 or workstation 14, respectively. Device 40 may include an illumination source 42, an imager 46 and a transmitter 41. Device 40 may be a swallowable device and/or may have shape and/or dimensions suitable for insertion into a body lumen and motility within a body lumen such as, for example, the gastrointestinal (GI) tract. In some embodiments of the present invention device 40 may be an autonomous device, e.g. may move in the body lumen (e.g., via peristalsis) independently from wired or tube connections to outside the body. Device 40 may be powered by an internal power source such as a battery and/or receive power from outside the body by a wireless power receiving system. System 100 according to embodiments of the present invention may be similar to embodiments described in U.S. Pat. No. 7,009,634 and/or in U.S. Pat. No. 5,604,531, each of which are assigned to the common assignee of the present application and each of which are hereby incorporated by reference. Of course, devices and systems as described herein may have other configurations and other sets of components. In alternative embodiments of the present invention, device 40 may not be an autonomous device. For example, device 40 may be included in any other vehicle suitable for traversing a lumen in a human body, such as an endoscope, stent, catheter, needle etc.

Device 40 may advance autonomously in an in vivo body lumen such as, for example, the GI tract, and may capture images as it travels along the in vivo body lumen. In some embodiments, device 40 may additionally collect other in vivo data such as, for example, PH data, temperature data or any other suitable kind of in vivo data.

Illumination source 42 may illuminate the in-vivo body lumen to enable capturing of in vivo images by imager 46. The light reflected from the body lumen may be converged or focused onto imager 46 by a suitable optical system (not shown) that may include, for example, a suitable structure of one or more lenses, mirrors and/or other optical components. Other components may be included in device 40 such as, for example, different suitable kinds of sensors, optics, electronics and/or structures, for example according to a specific purpose or mission assigned to device 40. Preferably, imager 46 is a suitable CMOS camera, such as a "camera on a chip" type CMOS imager specified by Given Imaging Ltd. of Israel and designed by Aptina Corporation of California, USA. In alternate embodiments, imager 46 may be another device, for example, a CCD. Illumination source 42 may be, for example, one or more light emitting diodes, or another suitable light source.

Device 40 may transmit by transmitter 41 captured images and/or other collected in vivo data and/or other information to receiver 12. System 100 may include a memory or storage device or medium 16, in which the data received by receiver 12 may be stored. The received data may be further transmitted or transferred to workstation 14. The transmission of data from receiver 12 to workstation 14 may be controlled by, for example, processor 13 in receiver 12. Workstation 14 may receive data from receiver 12 and/or from storage medium 16 and process the data and store the processed data in a memory or storage device or medium 18 and/or output the processed data to any suitable output device, such as, for example, a workstation, display, printer, mobile device and/or any other suitable output device. Memories or storage mediums 16 and/or 18 may include any of the computer readable storage medium mentioned above.

According to some embodiments of the present invention, the image data captured by imager 46, within in-vivo sensing device 40, and received by workstation 14 may be a digital color image data, although other image formats may be used in alternate embodiments. For example each frame of image data may include 256 rows of 256 pixels each, each pixel including bytes for color and intensity, according to known methods. For example, in each pixel, color may be represented by a mosaic of four sub-pixels, each sub-pixel corresponding to a color component such as red (R), green (G), or blue (B) (also called primary colors), wherein one color component is represented twice, e.g., in two sub-pixels in a pixel. The intensity of the overall pixel may be recorded by a one byte (e.g., 0-255) brightness value. The images may be received sequentially by receiver 12 and stored (e.g., sequentially) in storage medium 16 and/or storage medium 18 at workstation 14. The stored data may include color parameters such as color and intensity for each captured image pixel. Other image formats may be used.

The operations of workstation 14 and its processor 15, which will be described in detail herein below, may take place, for example, by instructions being executed by processor 15. The instructions may be stored in non-transitory storage medium 18 or in any other non-transitory storage medium readable by processor 15.

Images processed, displayed and output by workstation 14 may be input from devices and systems other than those described in FIG. 1. Workstation 14 may output images for observation by a health professional. Workstation 14 may also receive input from a user, for example a health professional, by any suitable user interface. In some embodiments of the present invention, the output images may be displayed on monitor 20 as an image stream together with information about of the location in the body lumen where the image was captured, so that, for example, the health professional may identify the location of pathology in a body lumen. In some embodiments of the present invention, the output images may be displayed sequentially according to chronological order. Other orders may be used. Additionally, the images may be displayed on monitor 20 along with additional data such as chemical, biological and/or physical data captured by other sensors in device 40. For example, corresponding additional data may be streamed along with the image stream in chronological and rhythmic match, so that image data is presented together with additional data that was captured in time proximity, or substantially concurrently, with the image data.

In embodiments of the present invention, workstation 14 may include a CAD classification tool 17 for facilitating medical diagnostics based on a set of images captured by device 40 along a body lumen. Classification tool 17 may be, for example, code or instructions or software stored in workstation 14, such as in storage 18, and executed by processor 15. In some embodiments, classification tool 17 may be or include a dedicated processor for execution of at least some of the processing required by classification tool 17, wherein a remaining portion of the processing, if exists, may be executed by processor 15. In some embodiments a classification tool 17 may include one or more classifier functions and/or borders or boundaries or other data items used to classify, and these data items may be changed when adjusting or altering the classification tool, and may be part of or stored with classification tool 17 or in a memory associated with classification tool 17. Other methods of altering a classification algorithm may be used.

The set of images captured by device 40 may be processed by processor 15 for presentation as an image stream to a health professional, for example on monitor 20. Additionally, processor 15 may produce out of the set of images a reduced set of images that may include the most relevant and/or informative images for medial diagnosis and/or exclude images that may be uninformative for medical diagnosis, such as images of healthy body tissue and/or redundant images, for example in order to enable a health professional to view a shortened set of images that may facilitate the medical diagnosis. In embodiments of the present invention, the production of the reduced set of images may include usage of classification tool 17 trained by machine learning methods. Based on a classification algorithm built according to embodiments of the present invention, the classification tool my classify images to or into predetermined groups or sets, for example according to measures/values of certain attributes in the images and/or in elements of the images and/or in data related to the images, for example, by image processing and analysis methods. The classification tool may classify the images between two groups such as, for example, healthy or unhealthy, interesting or non-interesting, relevant or irrelevant (to a certain medical situation) etc. Such classifications may be presented to a user for example, on a monitor (e.g., monitor 20). For example, images may be displayed along with a classification, or images corresponding to only one or a set of classifications may be displayed. However, in some embodiments, the classification tool may classify the images between more than two groups.

The set of images can be represented as image data items in a virtual multidimensional data space stored in workstation 14 (such as, for example, in storage 18), wherein the multiple dimensions represent a set of attributes relevant for the classification, so that each image can be mapped into and/or located in the data space based on the measures/values of the attributes identified in the image and/or in elements of the images and/or in data related to the images. In other words, each image can be represented by a point in a virtual multidimensional data space of attributes, wherein, for example, each dimension represents an attribute. The attributes used for classification may be related, for example, to shapes, shades, colors, red/green/blue (RGB) values, hue, saturation, intensity and the like, which may be identified in images and/or in elements of the images by image processing and analysis methods. In some embodiments, some of the attributes may relate to chemical, biological and/or physical data captured by other sensors in device 40, which may be related to a certain image data item according to, for example, proximate capture times of the certain image and the other data.

A variety of attributes may be used to detect, for example, in vivo pathologies (such as bleeding, polyps and ulcers), capsule location or transitions of the capsule from one GI organ to another (e.g. transition from stomach to small bowel or from small bowel to colon), the amount of turbid content which may be present in the images, etc. Examples of attributes that are used for detecting pathologies in an in vivo image may include, but are not limited to, uniformity of color within the suspected pathology region, high mean red criterion within the suspected pathology region relative to its surrounding area (e.g. perimeter) and/or relative to the rest of the image, a regular shape with high correlation to an ellipse shape and/or other possible attributes or features.

The classification algorithm may be built by training the classification tool according to machine learning methods, for example based on an initial input training set 19 of images that are already classified, e.g. labeled as belonging to one of the predetermined groups or sets. Initial training set 19 may be stored in storage 18 or in a dedicated storage. The construction of the classification algorithm may include determination, based on initial training set 19, of a classification border such as, for example, a virtual line or division, which is not limited to a straight line and may have the form of any non-linear function, in a data space that distinguishes between two groups of image data items. When a new set of images is received, the classification tool may classify the images according to the location of the image representative points in the data space relative to the classification border. For example, the location of an image representative point in the data space relative to the classification border can be represented by a score assigned to the image data item, and the classification tool can classify the images based on the assigned scores. A suitable classification tool may include a Support Vector Machine (SVM) or a non-linear SVM such as a Radial Basis Function (RBF) SVM or any other suitable classification tool, for example suitable for classification based on a non-linear border between the groups. For example, images can be processed and analyzed to identify measures/values of certain attributes in the images or in portions of the images that may imply unhealthy conditions such as, for example, certain colors, textures, saturation values, shapes, bulges, cavities and any additional relevant attributes that may imply unhealthy situations (for example, unhealthy tissue or environment conditions such as, for example, bleeding, edema, erosion, erythema, inflammation, neoplasia, polyps, infection etc.). An image may receive a score for each attribute according to the measure or value of this attribute in the image or in a portion of the image. For example, if red colors suggest an unhealthy condition, an image may receive a score for an attribute of redness according to, for example, the amount and/or intensity of red color in the image or in a portion of the image. According to the measures or values of the attributes in each image, each image may be mapped into a multidimensional data space of attributes. This space may be represented within a computer memory as a set of data which may be abstracted, for understanding or the sake of description herein, as a space, but the actual space need never be rendered or displayed.

As described herein, the term "attribute(s)" throughout the present application may refer to certain attributes (and may also be called characteristics or features) which may be identified in an image or a portion of an image by analysis and/or image processing of the image. The attributes may relate, for example, to certain colors, textures, saturation values, shapes, bulges, cavities, features and any additional relevant characteristic that may be used for classification of the image between or into predetermined groups as described herein, such as between "healthy" and "unhealthy", "relevant" and "irrelevant", "informative" and "uninformative", "interesting" and "uninteresting", etc. Thus attributes, as opposed to labels, may correspond to inherent qualities within an image, where labels may correspond to metadata or added data, separate from the image, which typically describe the image or a portion of the image. The term "label(s)" throughout the present application may refer to markings or tags assigned to or associated with the images by means of the classification process, which mark the images as belonging to one of the predefined groups as described herein. Accordingly, a label may mark an image as "healthy" or "unhealthy" (e.g., the image shows a healthy or unhealthy situation), "relevant" or "irrelevant", "informative" or "uninformative", "interesting" or "uninteresting", etc. After classification, the image data items can be stored together with their labels, for example, as labeled image data, in storage 18 or in any other storage. Labels may be stored separately. Typically, attributes are part of or inferred from image data itself, and thus is not stored separately or generated separately.

According to embodiments of the present invention, workstation 14 may receive an image stream that includes a set of images captured by for example device 40 while traveling along a body lumen. Typically, the images in the received set of images are not classified, e.g. not labeled as belonging to any group at this stage. Based on the received set of images, the pre-constructed classification algorithm can be adapted or changed, for example in order to improve the classification accuracy for the specific set of images. The adaptation of the classification algorithm may be based on relative locations of the image representative points of the received set in the data space and/or based on user input or indications about classification of the images, according to embodiments of the invention described in detail herein.

Figure 2:
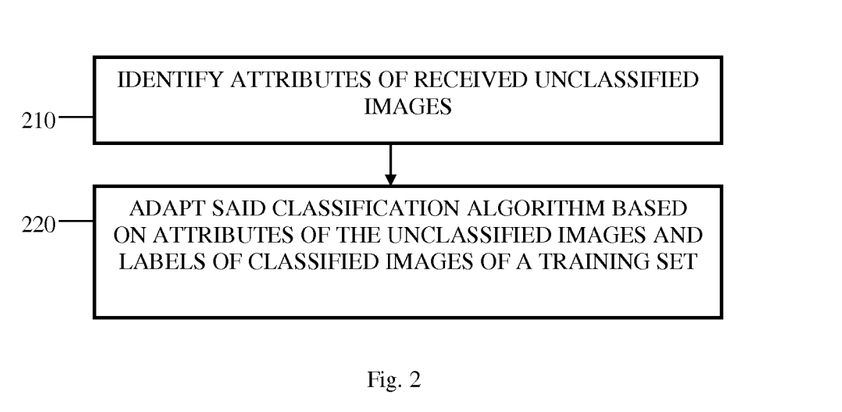
FIG. 2 is a flowchart illustrating a method for classification of images of an image stream according to some embodiments of the present invention.

One method for changing or adaptation of the classification algorithm according to embodiments of the present invention may use transductive learning for calculation of a classification algorithm adapted for a received set of images based on the labeled examples from the training set and known attributes of the received set of images in the data set. Reference is now made to FIG. 2, which is a flowchart illustrating a computer-implemented method for classification of images of an image stream according to some embodiments of the present invention. As indicated in block 210, attributes of received unclassified images may be identified. The attributes are typically predetermined attributes (or features) which are used in an initial classification algorithm. The initial classification algorithm may be trained on an initial labeled training set. As indicated in block 220, said classification algorithm may be adapted, e.g. the classification border described herein may be adapted, changed or adjusted, based on attributes of the unclassified images and based on labels of classified images of a training set. The adapted classification algorithm may provide improved classification results of the evaluated image stream, e.g. less false-positive indications and/or less false-negative indications than the initial (unadapted) classification algorithm. The concept of transductive learning is illustrated with reference to FIG. 3.

Figure 3:
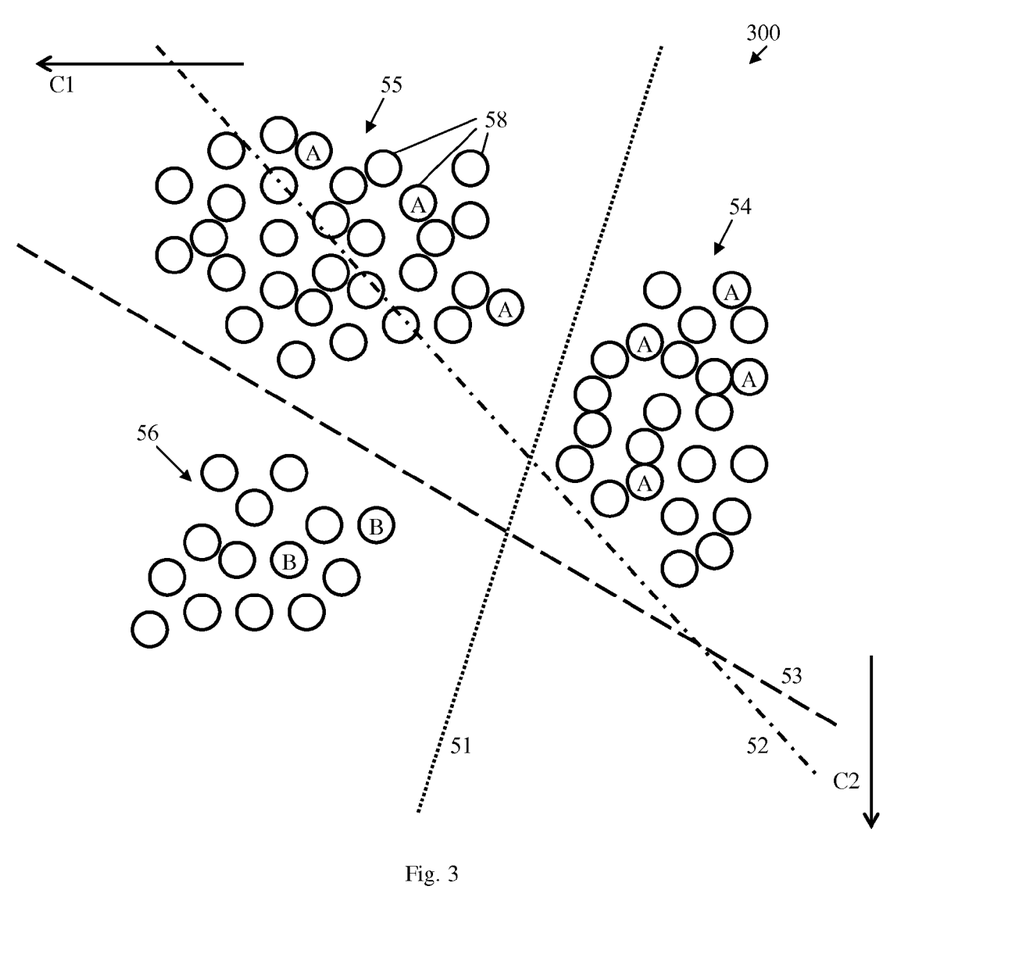
FIG. 3 is an exemplary two-dimensional cross-section illustration of a data space.

Reference is now made to FIG. 3, which is an exemplary two-dimensional cross-section illustration of a data space 300. A two-dimensional cross-section is chosen for the convenience of presentation only. Data space 300 according to embodiments of the present invention may include any number of dimensions, for example according to the number of attributes used for classification. The orthogonal dimensions C1 and C2 may represent, for example, two separate attributes used for classification, or two linear or non-linear combinations of such attributes. Image representative points 58, sometimes called herein data items 58, may be distributed in data space 300, each representing an image data item (e.g. the data representing an image) with certain measures/values of attributes, based on which the representative point 58 is located in data space 300.

Some of representative points 58, those labeled A or B, represent labeled image data items, which may be included in a training set of images. Without the labeled training set, processor 15 may receive a set of unlabeled images and try to distinguish between groups or sets based on relative locations of points 58. For example, without any given specific labels, processor 15 may be able to identify a group of images with distinguished characteristics according to the relative locations of points 58 within and outside this group. For example, processor 15 may identify a distinguished group of points clustered together, such as group 54 shown in FIG. 3, and may recognize the distinguished group as showing an anomaly relative to the rest of the points 58. Accordingly, without the labeled training set and/or without any given specific labels, processor 15 may determine a border 51 between two identified groups in a specific set of images, with no respect to any specific labels, merely based on identified clusters of image representative points 58 in data space 300.

An adaptation or changing of the classification algorithm according to embodiments of the present invention may include the use of information embedded in a received image stream of unclassified images for adjustment of the classification border which may be determined, for example, by training of the classification tool according to the labeled training set of images. For example, in a two dimensional data space mapping or representing the attributes "redness" and "ovality" (e.g., with each quality represented by the position of images on an axis corresponding to that quality), the images may be located on the X-Y axis according to "redness" and "ovality" scores, so that each image data item is represented by a point in the data space that represent a "redness" score and an "ovality" score. The predetermined border in the data space may distinguish between "healthy" and "unhealthy" data items. According to the border, for example, a first image with a "redness" score 5 and "ovality" score 8, may be labeled as "unhealthy", wherein a second image with a "redness" score 6 and "ovality" score 6 may be labeled as "healthy" (the indicated scores are for example and illustration only and does not limit the invention in any respect). However, according to embodiment of the present invention, the label of an image, for example the second image, may be determined to be different, e.g. "unhealthy". The determination may be based on, for example, the location of the second image relative, for example, to certain identified cluster of points in the data space, or based on direct or indirect input by a user as described in detail herein. In some embodiments of the present invention, the scores of the second image may render it proximate or close (in terms of the geometric distance on the X-Y grid) to the predetermined border, and a user may be asked for indication regarding classification of the second image in order to determine more accurately the border, for example the shape of the border in the surroundings of the point representing the second image.

By relying on a training set of labeled images, such as the examples labeled A or B in FIG. 3, a classification tool executed by processor 15 or another dedicated processor can calculate by an inductive learning algorithm an induced classifier function designed for predicting a correct label for any future received example of an image data item. The induced classifier function may be stored, for example as a part of a classification algorithm, in classification tool 17 and/or storage 18 and may be retrieved when required by classification tool 17 for classification of images. The induced classifier may be a function of all or some of the attributes represented in data space 300 and may determine a border such as, for example, a virtual line or division, between groups or sets labeled A and B in data space 300. There are many ways to pass a border between examples labeled A and B, especially when there are not many labeled examples. For examples, both borders 52 and 53 are exemplary possible borders between the groups of labeled examples. The exact manner in which the border is calculated depends on specific settings such as desired classifier margins, thresholds, flexibility of the learning algorithm, regularization of the classifier function, etc. Although borders 52 and 53 as shown in FIG. 3 are linear, the invention is not limited in this respect and any of borders 52 and 53 may have the form of any non-linear function in space 300. Once determined, the border may be used for classification of images in received unlabeled sets of images, by labeling images of the set as A or B. As discussed above, such constant classification algorithm may not be optimal for all possible input sets of images and may use too strict thresholds to account for most extreme possible cases of false-negative errors, for example because of too large uncertainty. These deficiencies is amplified because, especially in the field of medical diagnostics, obtaining labeled sets of images for training is costly and time consuming, because of the difficulty to obtain various kinds of unhealthy labeled images and the costly time of health professionals who can label the examples. Therefore, the number of labeled examples of images is relatively small. Additionally, regulation authorities do not trust this kind of classification algorithms to be reliable enough to replace full review of the whole set of received images by a health professional.

Determined by using inductive learning based on the labeled examples and without considering the relative locations of points 58 in data space 300, border 52 may pass through a cluster 55 of data items, as shown in FIG. 3. However, the relative proximity of some data items 58 in data space 300, such as the data items in cluster 55, may imply that these images belong to the same group, e.g. probably should have the same labels. According to some embodiments of the present invention, a classification tool executed by processor 15 may use transductive learning to calculate a classifier function adapted for a specific received set of images based on the training set of labeled images labeled A or B and in conjunction with attributes of the received unlabeled images.

For calculation of a classifier function by transductive learning according to some embodiments of the present invention, processor 15 may identify groups of image data items based on their relative locations in data space 300 and/or based on relatively close labeled examples. For example, processor 15 may identify clusters 54, 55 and/or 56. In some embodiments, some data items may belong to a certain cluster with lower probability than other data items. Processor 15 may assign to data items probabilities of belonging to a certain cluster. In some embodiments, a data item is identified as belonging to a cluster if it has an assigned probability higher than a certain value. In some embodiments, an identified cluster may include labeled examples of one kind only. For example, clusters may first be identified based on relative proximity of a plurality of points 58, and if such a cluster includes labeled examples of more than one kind, the cluster may be further divided to smaller clusters. In some other embodiments, the clustering process may start from the individual labeled examples, and merge the closest data items into clusters. Various kinds of clustering may be used.

Based on the identified clusters, processor 15 may set, e.g. create or adjust a learning algorithm to consider the identified clusters for calculating a classifier function based on the labeled examples. For example, the learning algorithm may consider data items in a cluster as having the same label as a labeled example included or proximate to the cluster. Alternatively, processor 15 may assign to the data items certain probabilities of having the same label as labeled examples included or proximate to their clusters, for example based on proximity of the data items to the labeled examples and/or based on the probability that the data items belong to their clusters, and the learning algorithm may consider the assigned probabilities of having the same label as the labeled examples. The resulting classifier function determines a border such as a virtual line or division such as, for example, border 53 between groups labeled A and B in data space 300, wherein the calculated border considers the relative locations of data items 58 in data space 300. In this manner, the classification algorithm may be adapted or changed to a specific received set of images, which may result in more accurate classification of the images of the specific set. Also here, the exact manner in which the border is calculated depends on specific settings such as desired classifier margins, thresholds, flexibility of the learning algorithm, regularization of the classifier function, etc.

Figure 4:
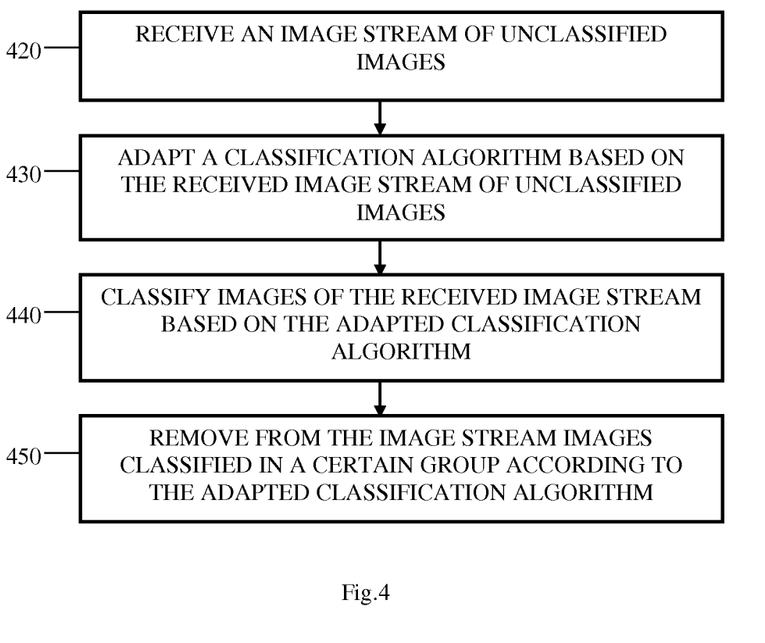
FIG. 4 is a flow-chart illustrating a method for classification of images of an image stream according to embodiments of the present invention.

Reference is now made to FIG. 4, which is a flow-chart illustrating a computer-implemented method for classification of images of an image stream according to embodiments of the present invention. As indicated in block 420, an image stream of unclassified images may be received, for example in a storage unit (e.g. storage 18) or processing unit (such as processor 15). As indicated in block 430, a classification algorithm may be adapted, changed or adjusted, e.g. the classifier function and/or border described herein may be adapted, changed or adjusted based on the received image stream of unclassified images, for example according to embodiments of the present invention as described herein. As described herein, according to some embodiments, the classification algorithm is adapted based on attributes of the unclassified images and labels of classified images of a training set.

According to other embodiments of the present invention, processor 15 may receive user input or indications from a user such as, for example, a health professional about classification of images of the image stream, for example, while the health professional views or reviews the image stream. The image stream may be presented to the user for viewing or review, for example, on a monitor such as monitor 20 (FIG. 1) by workstation 14 outputting an image stream or movie to monitor 20. Other ways of providing an image stream or movie may be used. The user input may be provided or received by any suitable user interface, e.g., a keyboard or input device such as a touchscreen or mouse, labeled "input" in FIG. 1. The user input or indications may include, for example, direct labeling of the images as belonging to one of the predetermined groups, for example, with or without indication of a level of certainty. The user input may include, for example, indirect user input, e.g. user input that may be concluded from the user behavior (but which does not include explicit instructions regarding the classification of the image by the user) such as, for example, duration of watching an image, or input that causes the duration of presentation of an image or portion of an image stream to change. For example, if a health professional watches an image for certain or longer duration of time, the image may be regarded as labeled "unhealthy", e.g. as showing an unhealthy situation, and an "unhealthy" indication may be generated (e.g. automatically) or inferred. In contrast, a user may directly, using a user interface, mark an image as being "unhealthy." Processor 15 may change or adapt the classification algorithm based on user-based indications, which may be determined according to direct or indirect user input. In some embodiments, the user-based indications are used for rebuilding the initial classification algorithm, for example by retraining the initial classification tool, as described in detail herein. The adaptation of the initial classification algorithm may include rebuilding of the initial classification algorithm based on the received user input about classification of images. In some other embodiments, the user-based indications may be used for adjusting thresholds of the initial classification algorithm, as discussed in more detail in FIGS. 5 and 6, for example instead of retraining of the classification tool, thus, for example, economizing the computational power being used.

As indicated in block 440, images of the received image stream may be classified based on the adapted classification algorithm. As indicated in block 450, images classified in a certain group according to the adapted classification algorithm may be removed from the image stream. In some embodiments of the present invention, the adaptation of classification algorithm, the classification of images and/or removal of images may be performed dynamically, for example in real time and/or while a health professional is reviewing the received image stream.

Figure 5:
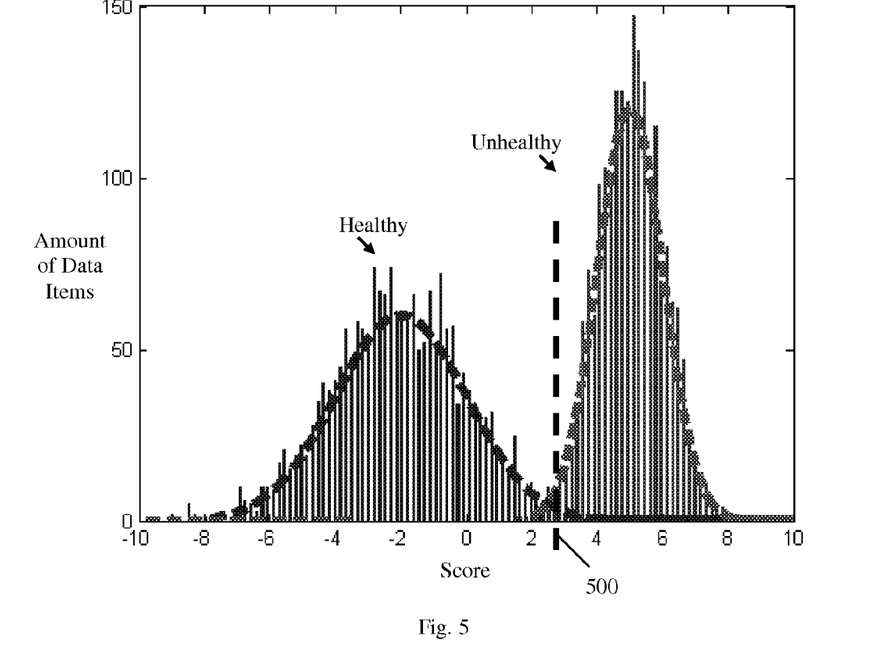
FIG. 5 is a schematic diagram illustrating score distribution of a set of data items according to embodiments of the present invention.

As discussed above, an induced classification algorithm built based on a labeled set of images may have insufficient information and therefore may use too strict classifier thresholds to account for most extreme possible cases of false-negative errors. According to embodiments of the present invention, the classifier thresholds may be adjusted to conform to a received set of unlabeled images. In one embodiment, the adjustment may be based on user input about classification of at least a subset of the received images. Thus, for example, more accurate thresholds can be used. In some embodiments, the adjustment of the thresholds may be performed instead of entirely rebuilding the classification algorithm, thus reducing the consumption of computational power of processor 15. The concept of the classifier threshold is illustrated with reference to FIG. 5, which is a schematic diagram illustrating score distribution of a set of data items according to embodiments of the present invention. As shown in FIG. 5, two distinguishable groups or sets can be identified in the diagram, which includes data items that were classified according to their scores as belonging to one of two groups such as, for example, the healthy and unhealthy groups. A classifier threshold 500 may be determined, such that, for example, data items with score above this threshold are classified as unhealthy (e.g. showing unhealthy situation). As mentioned above, a low false-negative error rate is required for reliability of the medical diagnosis. Therefore, classifier threshold 500 may be determined to allow a low false-negative rate such as, for example, 2% rate of false-negative errors (e.g., 2% of the unhealthy examples will be classified as healthy) or lower rate of false-negative errors, or any other suitable rate as may be decided.

Adjusting the classifier threshold 500 may be based, in one embodiment, on a combination of the initial (un-adapted) classifier, trained on an initial labeled training set, and at least a subset of images from the current image stream being evaluated or reviewed. The subset of images from the current image stream may be user-labeled in some embodiments, or unlabeled in other embodiments.

Figure 6:
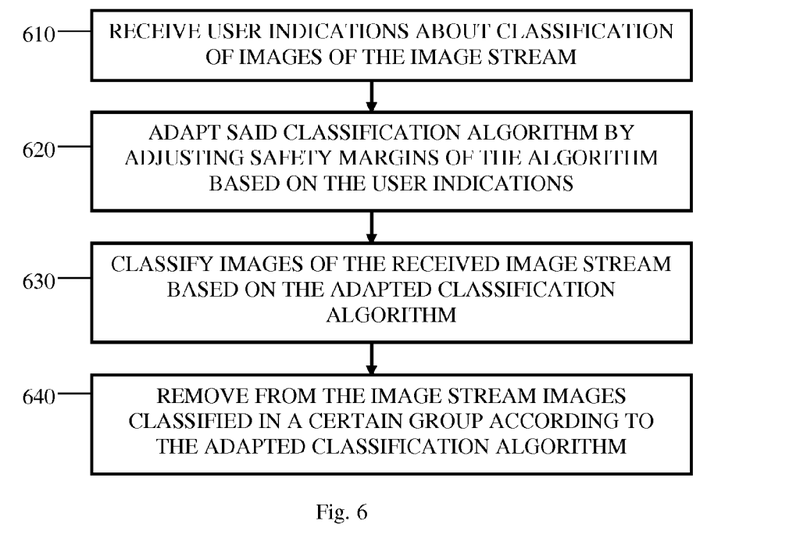
FIG. 6 is a flowchart illustrating a method for classification of images of an image stream according to embodiments of the present invention.

Reference is now made to FIG. 6, which is a flowchart illustrating a method for classification of images of an image stream according to embodiments of the present invention. As indicated in block 610, processor 15 may receive indications from a user, for example a health professional, about classification of images. For example, a health professional may review an image stream and provide direct or indirect indications (e.g. indications that may be concluded from the user behavior) as the image stream passes as described herein.

For example, indirect indications of user interest in images may be generated by Automatic Doctor Labeling (ADL), e.g. by the health professional pausing the image stream when an interesting image appears, for example an image suspected as showing pathology, unhealthy situation or anatomical landmark, and then proceeding with reviewing. Processor 15 may receive these pauses as indirect input of user interest and automatically generate, calculate or create user-based indications about classification of the images based on the indirect indications. For images in portions of the image stream watched by the professional without a pause or without a sufficiently long pause, processor 15 may generate, calculate or create user-based indications of a healthy situation/condition. In case the professional pauses the image stream at a certain image, processor 15 may generate a user-based indication of a suspected unhealthy situation/condition regarding that image for example in case the pause lasts more than a predetermined period of time, such as a second or a period less than a second, or a few seconds, or any suitable period of time according to specific settings.

Different properties of the user's behavior may be logged or stored (e.g., saved in a memory) and used to generate user-based indications based on a user's interest in one or more images of the image stream. For example, an indirect input of user interest in images may be determined if a health professional watches a specific portion of the image stream several times, e.g. watches a segment of the image stream repeatedly twice or more. A processor such as processor 15 may determine a user indication based on such indirect user input, or user behavior. The review time which a physician spends watching one or more images of the image stream may provide yet another indirect input property which may be measured. For example, if the reviewer changes the display rate of the image stream (either increases the frame display rate to faster than normal, which may indicate "healthy" or "not interesting" images, or reduces the frame display rate to a slower display rate, which may indicate user interest in an image or in a segment of the image stream), a processor such as processor 15 may determine that the user input for a certain image or set of images is "healthy", etc.

Specific user behavior or actions during review of (e.g., at substantially the same time that a user is reviewing) the image stream on the image stream may also be used as indirect input of user interest, e.g. selecting an image as a thumbnail image or a "finding", revisiting an image, comparing between images (which may be for example images from the image stream or from more than one image stream, or from the image stream to a pathology atlas, etc.). Intensive scrolling through images may indicate an interesting stream segment, while a long continuous segment viewed with no interruption may be considered as a "not interesting" segment (E.g., a processor may determine that the user input is "not interesting"). A selected viewing mode for certain segments of the image stream may be measured, logged or stored, and may indicate user interest (e.g., viewing a single large image, a dual display of two images presented simultaneously, a quad display of four images presented simultaneously, etc.). The number of images viewed while the user pauses the image stream (and scrolls through the stream manually) may provide another indirect input of user interest in an image or a movie portion, and may be measured, at least in a portion of the image stream. In some embodiments, the number of thumbnail images set by the reviewer (e.g. along the complete image stream or in a portion thereof) may be used as indirect user input.

The properties of user behavior may be logged or measured (e.g. by computer-implemented software which may be executed or operated by, for example, processor 15), and may be used for calculating the user-based indications about classification of the images. User reviewing may involve for example a user viewing an image stream or movie, and while or during (e.g., at substantially the same time or time period) the review, providing input, e.g., to workstation 14, controlling the presentation of the image stream, such as the frame rate or direction (forward, backward), pause commands, or other commands. Such commands may affect the review, causing the overall time spent on certain portions to increase (if the user slows or pauses the presentation) or increase (if the user increases the frame rate), causing certain portions to be repeated or presented more than once, or other modifications. Example calculations based on the logged properties may include: a median of total review or viewing time, an average or median of the net playing time of the image stream, median of one or more segments of continuous play duration, median of the longest continuous play duration, median of the pause duration, median of the number of images scrolled through (manually) during the pause duration, time spent on certain viewing modes (e.g. QuickView display mode, a mode allowing for multiple frames to be displayed at the same time, or other display modes). In some embodiments, a combination (e.g. linear or non-linear) of one or more of the above properties may be used for determining the user-based indications about classification of the images. Other properties may be measured.

Direct user input may include, for example, a subset or portion of images which are labeled or classified by the reviewer. In one embodiment, processor 15 may analyze the evaluated image stream and may select a subset of images for user labeling. The selected subset of images may include, for example, images which were analyzed as borderline cases or insignificant by the initial (e.g., un-adapted) classification algorithm, e.g. images which received a statistically insignificant "unhealthy" classification or a statistically insignificant "healthy" classification score.

The direct or indirect user input may be used for adapting, changing, tuning or improving the initial classification algorithm, and for producing an adjusted classification algorithm which provides more accurate classification results. Processor 15 may use the direct or indirect user input as labels classifying the image data items.

As indicated in block 620, the classification algorithm may be adapted by adjusting thresholds or safety margins of the algorithm based on the user-based indications. For example, processor 15 may refer to the image data items for which user-based indications has been received/generated as labeled examples, e.g. using direct user input. By having more labeled examples, the distribution of scores may typically be closer to normal distribution, and therefore a more accurate threshold may be determined. For example, a threshold that may allow a certain false-negative rate may be set closer to the most probable score, for example since the uncertainty may be lower. In one example, the thresholds may be set to maintain the vast majority of pathologies for all cases in the initial training set (e.g., for safety reasons). When adapting the classification algorithm to a specific image stream, these thresholds (or safety margins) may be relaxed, e.g. if the distribution of scores is not near the worst case scenario.

As indicated in block 630, images of the received image stream may be classified based on the adapted classification algorithm. As indicated in block 640, images classified in a certain group or set according to the adapted classification algorithm may be removed from the image stream. In some embodiments of the present invention, the adaptation of classification algorithm, the classification of images and/or removal of images may be performed dynamically, for example in real time and/or while a health professional is reviewing the received image stream.

Figure 7:
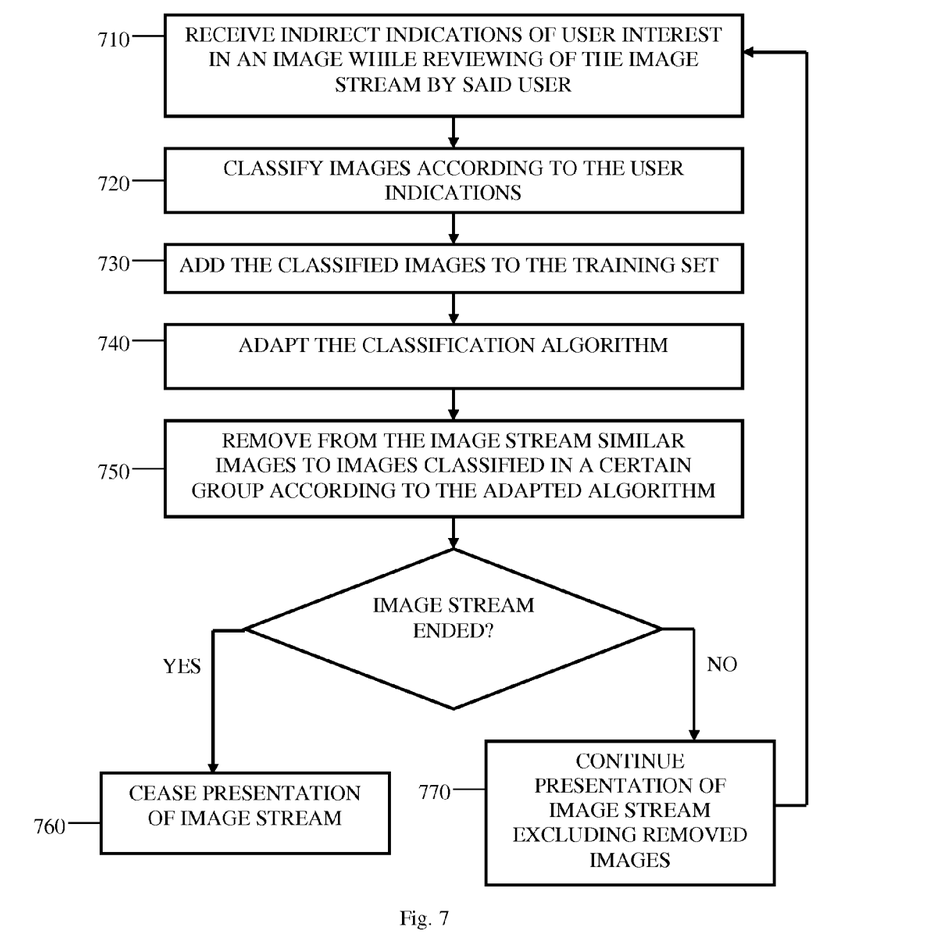
FIG. 7 is a flowchart illustrating a method for dynamic classification of images by automatic labeling according to some embodiments of the present invention.

Reference is now made to FIG. 7, which is a flowchart illustrating a method for dynamic classification of images by, for example, automatic labeling according to some embodiments of the present invention. As indicated in block 710, indirect indications of user interest in an image may be received while reviewing of an image stream by a user. The image stream or movie may be presented to a user on a monitor 20. The image stream may be a series of images presented in, e.g., an image stream or movie form, and may be viewed or reviewed by a user. As indicated in block 720, indirect indications of user interest in an image may be received while viewing of the image stream by said user. As described herein, processor 15 may generate user-based indications about classification of images based on the indirect input and may use the image data items for which direct input is received as labeled classified data items. As indicated in block 730, the classified images may be added to initial training set 19 of classified images and thus, for example, creating an updated or enhanced training set which may be more relevant for the set of images being reviewed. As indicated in block 740, the classification algorithm may be adapted or changed to be more accurate for the set of images being reviewed, for example by retraining the classification algorithm based on the updated training set to create an adapted classification algorithm, or by adjusting the threshold of the algorithm. As indicated in block 750, similar images to images classified in a certain group according to the adapted algorithm may be removed from the image stream. For example, images that were not yet reviewed by the health professional and that are similar to images classified as showing healthy situation, may be removed from the image stream. The manner in which similarity is determined may base on location of the image data items in the data space and/or based on other parameters of similarity which may be identified, for example, by image processing and analysis methods. For example, similarity may be determined based on parameters relevant for determining attributes of the images that may be relevant and/or used for the classification. For example, a certain threshold for similarity can be determined, and an image may be removed from the image stream if the image is similar above the determined threshold to another image classified in a certain group.

After images are removed from the image stream, in case the image stream ended, as indicated in block 760, the presentation of the image stream may be stopped. In case the image stream has not ended, as indicated in block 770, the presentation of the image stream may be continued excluding the removed images. The process may repeat until the image stream ends.

The above described method may be sensitive to mistakes made by the reviewing professional, because if the reviewing professional indicates by mistake, directly or indirectly, that the image shows a healthy situation, all the similar images may be removed from the image stream. This may be prevented by moderating the image removal algorithm so that, for example, images are not removed from the image stream before a certain determined number of similar images are indicated as healthy by the reviewing professional.

Figure 8:
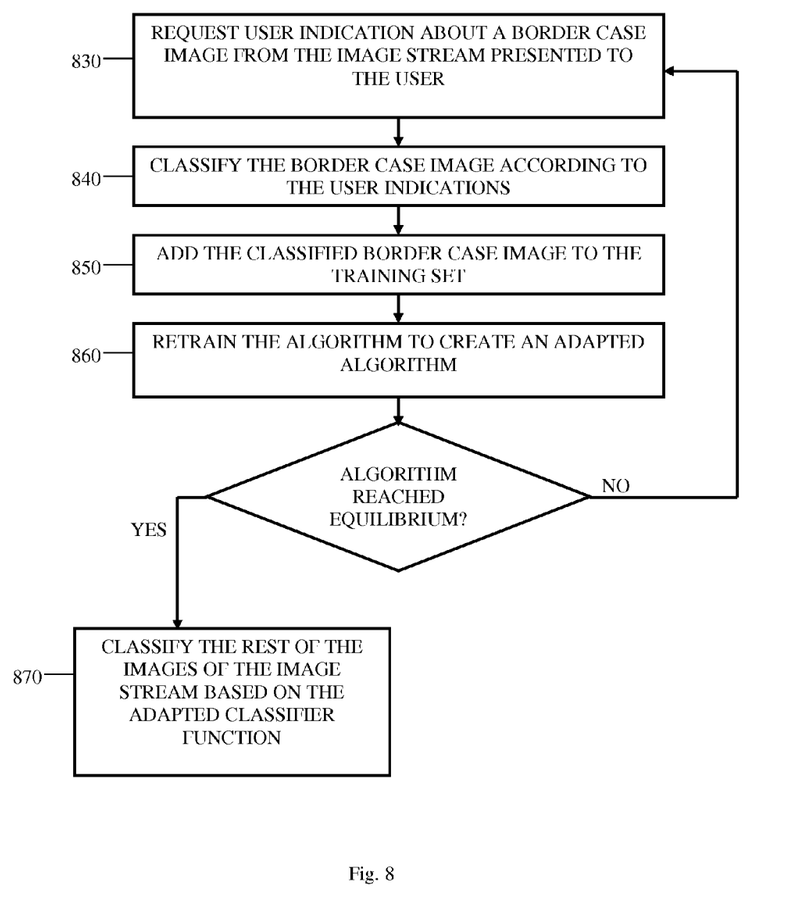
FIG. 8 is a flowchart illustrating a method for dynamic classification of images by active learning according to some embodiments of the present invention.

Reference is now made to FIG. 8, which is a flowchart illustrating a method for dynamic classification of images by active learning according to some embodiments of the present invention. In some embodiments, processor 15 may present to the health professional (e.g., by displaying on a monitor) specific images, e.g. a subset of images from the image stream for review, in order to receive indications about classification of these images. For example, the images may first be classified by an initial classifier function calculated based on the initial set of labeled examples of the training set, and then processor 15 may present border case images, e.g. the images whose labeling by a user may mostly reduce the error of the classification algorithm, such as, for example, the closest images and/or images that are closer than a certain determined distance (the distance, e.g., may be expressed in score units according to the scores assigned to each image data as described above) to the border in data space 300 determined by the induced classifier. The border images may be presented in order to receive user input (e.g. direct user input) about the classifications of the border images. Based on the indications about border images, processor 15 may adapt or change the classification algorithm. As indicated in block 830, a user input about a border case image from the image stream may be requested. The border case images may be determined statistically, for example by processor 15. For example, a border case image may be one of the images for which the initial classification algorithm is least sure about its classification, namely the closest images to the classification border and/or images that are closer than a certain determined distance to the classification border, e.g. images which received uncertain classification scores by the initial classification algorithm, e.g. soft margins whose absolute value is relatively low. As indicated in block 840, the border case image may be classified according to the user inputs. As indicated in block 850, the classified border case image may be added to the training set, thus, for example, creating an updated training set that may be more relevant for the specific set of images. As indicated in block 860, the classification algorithm may be retrained to create an adapted classification algorithm based on the training set of images and thus, for example, to create an adapted classifier function. In case the classification algorithm reached equilibrium, e.g. the adapted classifier function is highly similar to the previous classifier function according to predetermined criterions, as indicated in block 870, the rest of the images of the image stream may be classified based on the adapted classifier function. Additionally or alternatively, the method may include removing from the image stream similar images to images classified in a certain group or set according to the adapted algorithm. As discussed above, the manner in which similarity is determined may base on location of the image data items in the data space and/or based on other parameters of similarity which may be identified, for example, by image processing and analysis methods. For example, similarity may be determined based on parameters relevant for determining attributes of the images that may be relevant and/or used for the classification. For example, a certain threshold for similarity can be determined, and an image may be removed from the image stream if the image is similar above the determined threshold to another image classified in a certain group.

Other or different operations may be used for the various flowcharts shown.

In case the classification algorithm has not reached equilibrium, e.g. the adapted classifier function is not highly similar to the previous classifier function, the whole process may repeat from further requesting indication about a border case image, for example, the next border image in the image stream. The process may repeat until the classification algorithm will reach equilibrium.

As indicated above, regulatory authorities such as the US Food and Drug Administration (FDA) may not approve regular CAD tools for diagnostics by a health professional without additional reviewing of the complete set of images. Some embodiments of the present invention, as described, enable adaptation of the classification algorithm according to user inputs about images in the image stream being classified. Since this adaptation may improve the classifier by making it more reliable for classification of the certain image stream, and since the adaptation is based on indications of the health professional himself, which is usually regarded by regulatory authorities as very reliable, these embodiments of the present invention may overcome the objections of the regulatory authorities, and may enable approval of the improved classifier as a diagnosis tool without requiring additional complete review of the set of images by a health professional.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer-implemented method for classification of images of an image stream, the method comprising:
   receiving an image stream of unclassified images;
   receiving user input about classification of a subset of unclassified images of the image stream, wherein said receiving user input comprises:
   receiving indirect input of user interest in an image during review of the image stream by said user; and
   automatically generating user-based indications about classification of images according to the indirect input of user interest;
   identifying attributes of the received unclassified images; and adapting an initial classification algorithm to classify images to groups, based on the user-based indications and based on attributes of at least a subset of the received image stream of unclassified images.

2. The method of claim 1, wherein said adapting is performed dynamically during review of the image stream by a health professional.

3. The method of claim 2, comprising removing from the image stream images with similarity above a certain threshold to images classified in a certain group according to the dynamically adapted classification algorithm.

4. The method of claim 1, wherein said adapting comprises: classifying a subset of images from the image stream according to the user-based indications, adding the classified images to an initial training set to produce an enhanced training set, and adapting the initial classification algorithm based on the enhanced training set.

5. The method of claim 1, wherein said adapting comprises adjusting a classifier threshold of the initial classification algorithm based on the user-based indications.

6. The method of claim 1, comprising presenting border case images to a user and receiving said user input regarding said border case images, wherein said adapting is based on said user input regarding said border case images.

7. The method of claim 1, comprising classifying images of the received image stream based on the adapted classification algorithm and removing from the image stream images classified in a certain group according to the adapted classification algorithm to produce a reduced image stream.

8. A system for classification of images of an image stream, the system comprising:
   a memory storing in-vivo images;
   a processor to:
      receive an image stream of unclassified images;
      receive indirect input of user interest in an image during review of the image stream by said user;
      automatically generate user-based indications about classification of images according to the indirect input of user interest;
      identify attributes of the received image stream of unclassified images; and
      adapt an initial classification algorithm to classify images of the received image stream to groups, based on the user-based indications and based on attributes of at least a subset of the received image stream of unclassified images.

9. The system of claim 8, wherein the processor is to perform the adapting dynamically during review of the image stream by a health professional.

10. The system of claim 9, wherein the processor is to remove from the image stream images with similarity above a certain threshold to images classified in a certain group according to the dynamically adapted classification algorithm.

11. The system of claim 8, wherein the processor is to classify images according to the user input, add the classified images to a training set, and adapt the initial classification algorithm based on the training set.

12. The system of claim 8, wherein the processor is to adjust a classifier threshold of the algorithm based on the user input.

13. The system of claim 8, wherein the processor is to present border case images to a user and receive said user inputs regarding said border case images, wherein said adapting is based on said user inputs regarding said border case images.

14. The system of claim 8, wherein the processor is to classify images of the received image stream based on the adapted classification algorithm and remove from the image stream images classified in a certain group according to the adapted classification algorithm to produce a reduced image stream.

15. A method for classification of images of an image stream, the method comprising:
   receiving from an in-vivo sensing device an image stream of images;
   displaying the image stream to a user; and
   changing, based on indirect input of user interest in an image during review of the image stream by said user, an initial classification algorithm, the algorithm to classify images of the image stream to groups.

* * * * *